May 2, 1944.  E. P. BOLEN ET AL  2,347,806
TRIM PANEL
Filed Feb. 9, 1942

INVENTORS
EDWARD P. BOLEN
ALVIN C. LIND
BY Whittemore, Hulbert & Belknap
ATTORNEYS Patented May 2, 1944

2,347,806

UNITED STATES PATENT OFFICE 2,347,806

TRIM PANEL

Edward P. Bolen and Alvin C. Lind, Detroit, Mich., assignors to National Automotive Fibres, Inc., Detroit, Mich., a corporation of Delaware Application February 9, 1942, Serial No. 430,144

10 Claims. (Cl. 154—45.9)

The present invention relates to trim panels and more particularly to a trim panel covered with a plurality of pieces of trim fabric and provided with decorative means concealing the line of juncture between separate pieces of trim fabric.

In the past, automotive vehicles have been provided with interior trim, which includes trim panels secured to the inside of doors of vehicles. These trim panels are preferably padded, and are ordinarily covered with a fabric selected to harmonize with the upholstery fabric employed in the vehicle.

More recently trim panels have been made which are covered with fabric made up of a plurality of pieces so that an individual panel may have two or more colors presented by its trim fabric. This involves securing the edges of the separate pieces of fabric together along a seam and it has been suggested in the past that this line of juncture should be concealed by a molding strip. These molding strips have in the past been made of metal, and it is applicants' conception that the use of metal molding strips may be avoided by substituting a strip of decorative lace and combining this lace into the completed trim panel in a predetermined manner.

It is an object of the present invention to provide trim panels employing a lace strip for the purpose of concealing the line of juncture between separate pieces of trim fabrics.

It is a further object of the invention to provide a decorative lace bead for the joint purpose of concealing a line of juncture between separate pieces of trim fabric, and for imparting a decorative effect to the completed trim panel.

More specifically, it is an object of the present invention to combine a lace strip into a trim panel by employing a strip of rubber at the rear of the lace strip, to vulcanize the lace strip to the outer surface of the separate pieces of trim fabric, to provide a second strip of rubber between the trim fabrics and the panel board so as to secure the trim fabric to the panel board, and to mold the complete assembly into an outwardly convex bead by the simultaneous application of heat and pressure.

It is a further object of the invention to provide improved apparatus for facilitating the assembly of parts, as just outlined.

Other objects of the invention will be apparent as the description proceeds, and when taken in conjunction with the accompanying drawing, wherein.

Figure 1:
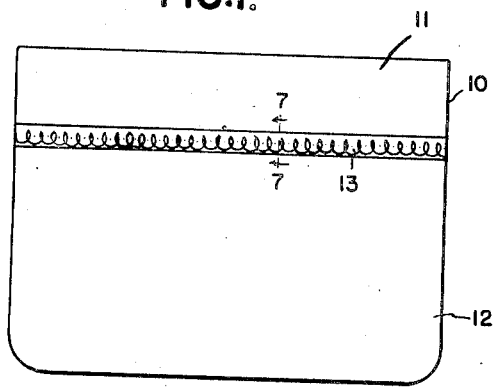
Figure 1 is a front elevation of a trim panel made in accordance with the present invention.
Figure 2:
Figure 2 is a side elevation of the trim panel shown in Figure 1.

Referring first to Figures 1 and 2, a completed trim panel is indicated at 10. This panel is provided with a fabric cover and in the embodiment illustrated, two separate pieces of fabric are employed to make up the cover. One of these is indicated at 11, and the other at 12. The fabric pieces 11 and 12 have a line of juncture which is concealed beneath a decorative lace strip 13. Preferably padding material such for example as cotton or the like is provided between the panel board and the cover fabric, which imparts a certain thickness to the panel board, as best seen in Figure 2. In addition, the lace strip 13, as seen in this figure, is outwardly convex so as to form a raised decorative bead.

The method of manufacturing our improved trim panel is well illustrated in Figures 3 to 6. The first step in the production is to make a subassembly comprising the panel board 20, the cover fabrics 11 and 12, a strip of uncured soft rubber 21, and the padding material 22.

The padding material 22 is first applied to the panel board 20 in any convenient manner. One manner of conveniently applying the padding material to the panel board is to deposit a continuous web of padding material onto a moving conveyor. A series of panel boards may be placed on the conveyor before depositing the continuous web of padding material thereon, or, if preferred, the series of panel boards may be placed on top of the continuous web of padding material. Thereafter the padding material may be trimmed away from the edges of the panel board by brushes and/or suction, and further may be removed from certain desired portions of the panel board in accordance with the decorative design to be imparted thereto. Thus for example when the panel is to be decorated in accordance with the decorative design shown in Figure 1, it is desirable to remove a continuous strip of padding material from the panel board along the zone to be covered by the lace strip 13.

Figure 3:
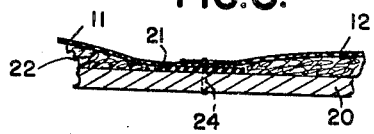
Figure 3 is a fragmentary sectional view illustrating one step in the production of our improved trim panel.
Figure 4:
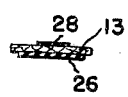
Figure 4 is a fragmentary sectional view illustrating another step in the preparation of our improved trim panel.

In preparing the subassembly illustrated in Figure 3, the panel board 20, after having the padding material 22 removed from a line extending across the panel board, is supplied with the strip 21 of uncured soft rubber. This strip 21 is of substantial thickness, as for example .020 inch. Conveniently, strips of rubber supplied with a backing of paper may be employed, in which case the paper side of the rubber strip is adhered to the panel board along the path from which the padding material has been removed.

The adjacent edges of the pieces of trim fabrics 11 and 12 are then brought together in overlapping relation and are secured to the panel board through the rubber. This operation is preferably performed by sewing, and in Figure 3 we have indicated a line of sewing at 24. If preferred, other securing means may, of course, be substituted, as for example a line of staples or other fasteners. Sewing is preferred however since in the completed panel the fabric is under some tension.

The next step in the production of our improved trim panel is to provide the lace strip 13 with a separate strip of uncured rubber 26 at its rear portion. This strip of rubber may be of about the same thickness as the strip 21, as for example .020 inch. Preferably it is of somewhat less width than the lace strip 13, as clearly indicated in Figure 4. It is also of less width than the width of the rubber strip 21, for a purpose which will later appear. The lace strip 13 may be of any suitable design, and in Figures 1 and 4 we have indicated at 28 a design which may be imparted thereto by a line of cord or the like, which is provided in applique. It will be appreciated that this is clearly a matter of design and the applique may be omitted if desired.

The strip of rubber 26 is not provided with a strip of paper, such as described in connection with the strip 21, for the reason that in the completed product the rubber 26 is to form a direct vulcanized bond between the lace 13 and the outer surface of the fabrics 11 and 12 overlying the sewed seam 24.

Figure 5:
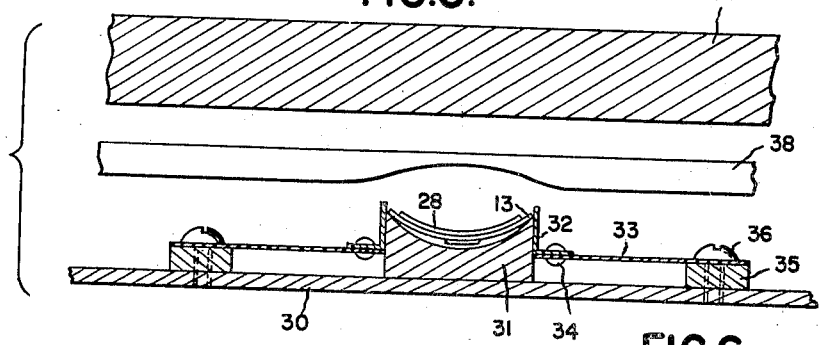
Figure 5 is a sectional view showing the press employed in the manufacture of our improved trim panels, and the relationship of elements going to make up the trim panel prior to the pressing operation.

In Figure 5 we have illustrated the press which is employed in the completion of the trim panel. In this figure a lower platen 30 is provided which carries an upwardly concave mold 31. The lace strip 13 with its attached strip of rubber 26 is placed in the mold with the rubber side up, as well illustrated. In order to facilitate exact location of the lace strip 13 in the mold, a specific structure is provided. This is rendered particularly advantageous due to the fact that the concavity of the mold 31 is both smoothly rounded and shallow, so that it does not lend itself particularly to definite and accurate location of the lace strip therein.

In order to accomplish this result, we provide angle pieces 32 which extend above the upper corners of the mold 31, as seen in Figure 5. These provide guiding flanges which serve to accurately locate the lace strip 13 in the concavity of the mold 31. The angle pieces 32 are attached to light spring strips 33 by suitable means such as the rivets indicated at 34. The spring strips 33 are mounted on blocks 35 by screws 36 or the like.

The arrangement is such that while the angle pieces 32 provide flanges which accurately position the lace strips 13, the angle pieces 32 may be pressed down when the mold is closed, so that they do not interfere with complete shaping of the lace and rubber into the desired decorative bead.

In order that the lace strip 13 may be applied smoothly, it is desirable to have the same tensioned while in the mold 31. For this purpose we provide sharp pins 40. In placing the lace strip 13 in the mold 31, one end is impaled by a pin 40 at one end of the mold and the lace strip is then drawn taut and the other end is impaled by a similar pin at the opposite end of the mold strip 31.

An upper platen 37 is provided, and the platens 30 and 37 are relatively movable toward and away from each other. After the lace strip 13 has been placed in the mold 31 with its rubber strip 26 exposed upwardly, the subassembly designated 38 is located over the mold 31. The subassembly 38 is that illustrated in Figure 3 and is made up of the panel board and its padding material, the cover fabrics 11 and 12, and the strip of rubber 21, the edges of the pieces of fabric 11 and 12 and the rubber strip 21 being sewed to the panel board as indicated at 24. This subassembly which has been designated 38 in Figure 5 is placed, fabric side down, over the mold 31 so that the seam 24 is located centrally over the mold.

The mold 31 is heated, and for this purpose is preferably made of a material having good heat conducting properties, such for example as brass. The heat may be supplied to the mold 31 through any convenient means, and for this purpose we have found that excellent results are obtained when steam heat is employed. Obviously, electrical resistance heating means, or other heating means could be employed if desired. The temperature of the mold 31 is kept below a value which would result in burning the lace strip 13, or the fabric pieces 11 and 12. On the other hand it is kept high enough so that a quick vulcanization of the rubber strip 21 and strip 26 will be effected.

These rubber strips are of a good quality of rubber compounded to effect rapid vulcanization when subjected to temperatures compatible with the fabrics. Rubber of the type employed for tire patches is suitable and is mentioned by way of example.

It may be mentioned that the mold 31 is provided with substantially sharp corners. These corners are not sharp in the sense that they will cut the fabric, but they are intended to depress the material therebeneath strongly against the panel board at a limited zone. The concavity of the mold 31 is carefully figured with respect to the quantity of the material which will be located therein, so that a very considerable pressure will be applied to all of the material in the mold, and this material will be pressed firmly against the panel board. As a result, each element going to make up the completed lace bead is pressed into firm contact with the material adjacent thereto.

Figure 7:
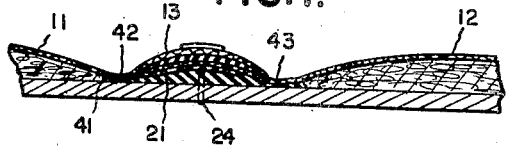
Figure 7 is a section on the line 7—7, Figure 1.
Figure 6:
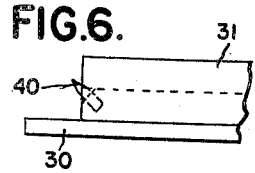
Figure 6 is a fragmentary side elevation of a portion of the mold element employed.

Rubber of the type employed in our improved construction tends to first soften upon the application of heat, and thereafter rapidly becomes set or vulcanized. When the parts have been assembled between the platens 30 and 37 as above outlined, the platens 30 and 37 are moved relatively toward each other. The rubber first becomes softened or plastic so that it accommodates itself to the shape of the mold. The lowermost strip 21, as seen in Figure 7, is thus shaped into an outwardly convex strip. It may be mentioned at this time that the strip of rubber 21 is provided in a width somewhat greater than the width of the molding strip or mold 31. Accordingly, the edges of the mold tends to compress the strip of rubber 21 directly beneath the edge corners of the mold. This has two effects: In the first place it causes a plastic displacement of some of the rubber inwardly so as to augment the outwardly convex bead previously referred to. Other of the rubber is displaced outwardly to form shallow beads indicated at 41 in Figure 7. These shallow beads provide depressed lines 42 and 43 in the fabric pieces 11 and 12, as clearly illustrated in Figure 7.

The pressure of the edges of the mold 31 in addition holds the fabrics 11 and 12 in firm engagement with the rubber strip 21 along the depressed lines 42 and 43. This has the effect of providing a very strong permanent vulcanized bond between the pieces of fabrics 11 and 12 and the panel board along the depressed lines 42 and 43. This is important because it accentuates the relief provided in the lace strip 13, as will be readily apparent.

The rubber strip 26 is also heated by the mold and is caused to undergo a plastic flow to the shape illustrated in Figure 7. This shape may be described as a lunar shape complementary to the convexity provided by the plastic deformation of the strip 21. The deformation of the two strips 21 and 26 in part provides the material which fills the convexity of the mold 31, so that the lace strip 13 is pressed firmly against the bottom of the mold to facilitate the transfer of heat from the mold to the rubber therein.

Since the strip of rubber 26 is of somewhat less width than the lace strip 13, rubber will not ordinarily be exposed along the edges of the lace strip 13, although there will be a sufficient plastic flow of rubber to provide a positive permanent vulcanized bond between the inner surface of the lace 13 and the outer surfaces of the fabric pieces 11 and 12.

By employing the guiding angle pieces 32 for positioning the lace strip 13 with its attached strip of rubber 26 in the mold, and by providing suitable jigs for positioning the subassembly 28 in the mold, it is possible to obtain very rapid production, and also to obtain substantial uniformity in the finished product. The rubber, as previously stated, is compounded so that it undergoes substantial vulcanization in a short interval, and accordingly a high rate of production will be maintained.

Since the sewed seam 24 is concealed beneath the lace strip 13, this seam need not be provided with particular accuracy.

Since the rubber provides the vulcanized bond between the various elements going to make up the combination, it may be possible in some cases to omit the step of sewing the edges of the fabrics together and to the panel board. In this case, to provide further strength, it may in some cases be desirable to provide a third thin strip of rubber between the edges of the overlapping edges of the pieces of fabrics 11 and 12 to insure a positive bond therebetween. Ordinarily, however, in order to facilitate production and to avoid the necessity of employing skilled labor in producing the subassembly 38, it is preferred to employ the sewing operation as described.

While we have illustrated in considerable detail a preferred apparatus and method for producing the novel trim panel, it will be appreciated that this full illustration and description is made for the purpose of enabling those skilled in the art to practice the present invention, the scope of which is indicated in the accompanying claims.

What we claim as our invention is:

1. A trim panel having a panel board, padding material spaced apart on said panel board and cooperating therewith to provide an outwardly opening channel shaped recess, a strip of resilient material within and extending lengthwise of said recess, a trim fabric covering the padding material upon one side of the recess and having an edge portion overlying the strip of resilient material, a trim fabric covering the padding material upon the other side of the recess and having an edge portion overlying the edge portion of the first mentioned fabric, a connection between the edge portions of the fabrics and said strip and panel board, a lace strip overlying the edge portions of said fabrics, and a strip of resilient material between the lace strip and edge portions of said fabrics and bonded to the lace strip and said edge portions.

2. A trim panel having a panel board, a strip of resilient material upon the panel board, a trim fabric covering the panel board upon one side of the strip and having an edge portion overlying said strip, a trim fabric covering the panel board upon the other side of the strip and having an edge portion overlying the edge portion of the first mentioned fabric, a connection between the edge portions of the fabrics and said strip and panel board, a decorative strip overlying the edge portions of said fabrics, and a strip of resilient material between the decorative strip and edge portions of said fabrics and bonded to the decorative strip and said edge portions.

3. A trim panel having a panel board, a strip of resilient material upon the panel board, a trim fabric covering the panel board upon one side of the strip and having an edge portion overlying said strip, a trim fabric covering the panel board upon the other side of the strip and having an edge portion overlying the edge portion of the first mentioned fabric, a decorative strip overlying the edge portions of said fabrics, and a strip of resilient material between the decorative strip and edge portions of said fabrics and bonded to the decorative strip and said edge portions.

4. A trim panel having a panel board, a cover fabric upon said panel board, a seam of sewing connecting said fabric to said panel board, a strip of soft resilient material extending along said seam between said fabric and said board, vulcanized to the rear of said cover fabric and formed into outwardly convex cross section, a second strip of resilient material vulcanized to the front of said cover fabric and overlying said seam and also formed to present an outwardly convex cross section, and a lace strip overlying and conforming to said second strip of resilient material, said second strip of resilient material being vulcanized to the rear of said lace strip and retaining said lace strip permanently secured in place.

5. A trim panel having a panel board, two separate pieces of trim fabric upon the panel board, a seam of sewing connecting said pieces of fabric together and to said panel board, a strip of soft resilient material extending along said seam between said fabric and said board, vulcanized to the rear of said cover fabric and formed into outwardly convex cross section, a second strip of resilient material vulcanized to the front of said cover fabric and overlying said seam and also formed to present an outwardly convex cross section, and a lace strip overlying and conforming to said second strip of resilient material, said second strip of resilient material being vulcanized to the rear of said lace strip and retaining said lace strip permanently secured in place.

6. A trim panel having a panel board, padding material spaced apart on said panel board and cooperating therewith to provide an outwardly opening channel shaped recess, a trim fabric covering the padding material upon one side of the recess and having an edge portion overlying the recess, a trim fabric covering the padding material upon the other side of the recess and having an edge portion overlying the edge portion of the first mentioned fabric, a strip of resilient material within said recess and bonded to said panel board and edge portions of the fabrics, a lace strip overlying the edge portions of said fabrics, and a strip of resilient material between and bonded to the lace strip and edge portions of said fabrics.

7. A trim panel having a panel board, padding material spaced apart on said panel board and cooperating therewith to provide an outwardly opening channel shaped recess, a strip of resilient material within and extending lengthwise of said recess, a trim fabric covering the padding material upon one side of the recess and having an edge portion overlying the strip of resilient material, a trim fabric covering the padding material upon the other side of the recess and having an edge portion overlying the edge portion of the first mentioned fabric, a decorative strip overlying the edge portions of said fabrics, and a strip of resilient material between the decorative strip and edge portions of said fabrics and bonded to the decorative strip and said edge portions.

8. A trim panel having a panel board, a strip of resilient material adhered to said panel board, a trim fabric covering the panel board upon one side of said strip and having an edge portion overlying said strip, a trim fabric covering the panel board upon the other side of said strip and having an edge portion overlying the edge portion of the first mentioned fabric, a strip of resilient material overlying the edge portion of the second mentioned fabric, and a decorative strip overlying the last mentioned strip and constituting a garnishment for the assembly, the overlapping edge portions of the fabrics being vulcanized to the two strips of resilient material aforesaid, and the decorative strip being vulcanized to the last mentioned of said two strips of resilient material.

9. A trim panel having a panel board, a strip of resilient material adhered to said panel board, a trim fabric covering the panel board upon one side of said strip and having an edge portion overlying said strip, a trim fabric covering the panel board upon the other side of said strip and having an edge portion overlying the edge portion of the first mentioned fabric, means securing the overlapping edge portions of the two fabrics to said strip and panel board, a decorative strip overlying the overlapping edge portions of the two fabrics and constituting a garnishment for the assembly, and a strip of resilient material between and vulcanized to the decorative strip and the overlapping edge portions of said fabrics.

10. A trim panel having a panel board, a strip of resilient material adhered to said panel board, a trim fabric covering the panel board upon one side of said strip and having an edge portion overlying said strip, a trim fabric covering the panel board upon the other side of said strip and having an edge portion overlapping the edge portion of the first mentioned fabric, a connection between the overlapping edge portions of the fabrics and the panel board including securing means extending through said strip, a decorative strip overlying the overlapping edge portions of the two fabrics and constituting a garnishment for the assembly, and a strip of resilient material between and vulcanized to the decorative strip and the overlapping edge portions of said fabrics.

EDWARD P. BOLEN.
ALVIN C. LIND.